Figure 1:
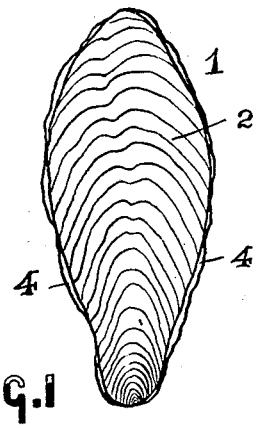

No. 722,361. PATENTED MAR. 10, 1903.
A. A. GEIGER, D. C. BAUER & J. PEJCHAR.
CUTTLEBONE MOLD.
APPLICATION FILED APR. 19, 1902.
NO MODEL. 2 SHEETS—SHEET 1.

WITNESSES:
Geo. L. Richards
H. B. Fraentzel

INVENTORS:
ALBERT A. GEIGER,
DANIEL C. BAUER,
& JOSEF PEJCHAR.
BY
Fred'k C. Fraentzel,
ATTORNEY No. 722,361. PATENTED MAR. 10, 1903.
A. A. GEIGER, D. C. BAUER & J. PEJCHAR.
CUTTLEBONE MOLD.
APPLICATION FILED APR. 19, 1902.
NO MODEL. 2 SHEETS—SHEET 2.

WITNESSES:
Geo. D. Richards
H. B. Fraentzel

INVENTORS:
ALBERT A. GEIGER,
DANIEL C. BAUER,
& JOSEF PEJCHAR.
BY
Fred C. Fraentzel,
ATTORNEY

THE NORRIS PETERS CO., PHOTO-LITHO., WASHINGTON, D. C.

UNITED STATES PATENT OFFICE.

ALBERT A. GEIGER AND DANIEL C. BAUER, OF NEWARK, NEW JERSEY, AND JOSEF PEJCHAR, OF NEW YORK, N. Y.

CUTTLEBONE MOLD.

SPECIFICATION forming part of Letters Patent No. 722,361, dated March 10, 1903.

Application filed April 19, 1902. Serial No. 103,719. (No model.)

*To all whom it may concern:*

Be it known that we, ALBERT A. GEIGER and DANIEL C. BAUER, citizens of the United States, and residents of Newark, county of Essex and State of New Jersey, and JOSEF PEJCHAR, a subject of the Emperor of Austria, residing at New York, in the county of New York and State of New York, have invented certain new and useful Improvements in Cuttlebone Molds for Casting in Precious Metals; and we do hereby declare the following to be a full, clear, and exact description of the invention, such as will enable others skilled in the art to which it appertains to make and use the same, reference being had to the accompanying drawings, and numerals of reference marked thereon, which form a part of this specification.

The invention described herein relates to improvements in the art of molding; and the invention has for its primary object to provide an improved "cuttlefish" mold for the purposes of casting, and especially the casting of the more precious metals—such as gold, silver, or the like—into various ornaments, as rings, lockets, and other trinkets.

The principal object of the present invention is to provide a cuttlefish mold with a protecting or reinforcing shell of a practically hard material—such as plaster-of-paris or other suitable plastic material which has hardening properties—whereby the ordinary cuttlebone or dorsal plate of the cuttlefish may be used under pressure in forcibly pressing the matrix into the softer or powder-like parts of the cuttlebone to provide a depression in the mold into which the metal is to be flowed without any danger of breaking the cuttlebone while under such pressure.

In the present manufacture of producing jewelry or other suitable ornaments to be cast in precious metals it has generally been the practice to employ the ordinary cuttlebone from the cuttlefish as a mold, usually by taking two pieces of the ordinary cuttlebone and cutting or sawing away a portion of the rounded and rough outer portion of that part opposite the skin, so as to be able to place two of such "sawed" surfaces upon each other after the depression in the soft parts has been made by the matrix.

In practice the matrix is forcibly pushed into the soft part of the cuttlebone to produce the impression desired; but owing to the fact that the harder or skin portion of the dorsal plate is not sufficiently strong to withstand undue pressure the same breaks or cracks very readily, and hence there is a loss of time in trying to produce a satisfactory mold, as well as a loss of the cuttlebone, which has been rendered useless. To overcome these serious objections to the use of the ordinary cuttlebone as now found, and, furthermore, in the larger sizes of cuttlebone to utilize the softer parts, which are now wasted, we have provided the novel cuttlefish mold, to be hereinafter more particularly described, thereby rendering the same resistible to pressure while compacting the softer layers or portions of the bone and to provide a mold of this character for endurance during the molding operations.

By the present invention a simple construction of mold for carrying on in an efficient manner the steps of casting in precious metals is the result.

The invention is capable of embodiment in any one or more forms in connection with cuttlefish-bones or dorsal plates of the cuttlefish; but one of the most advantageous of the forms in which it can be embodied is that represented in the accompanying drawings and hereinafter more especially described.

Figures 2, 3:
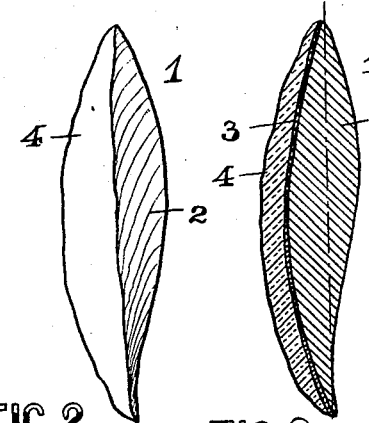
Figure 4:
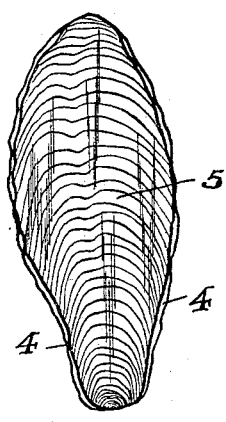
Figure 5:
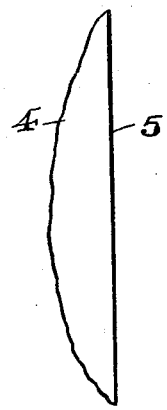
Figure 6:
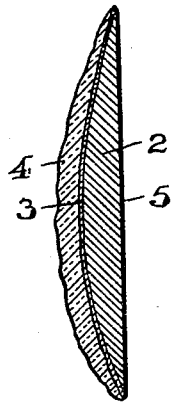
Figure 7:
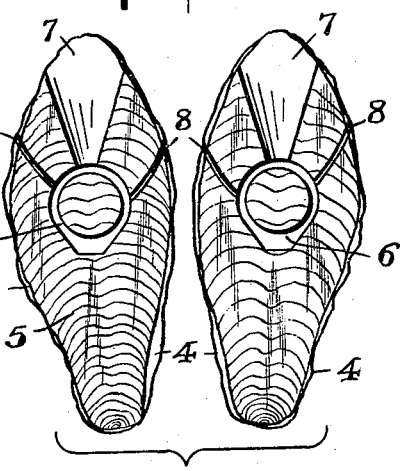
Figure 8:
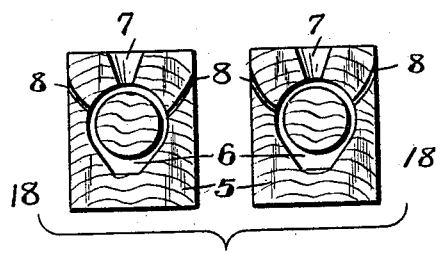
Figure 9:
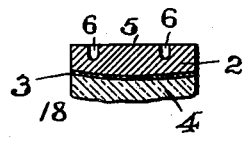
Figure 11:
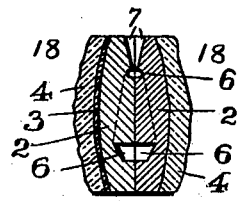
Figure 10:
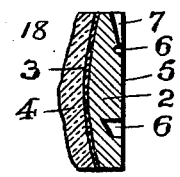
Figure 12:
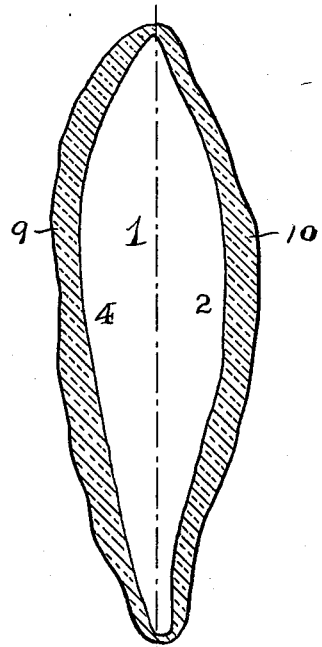
Figure 13:
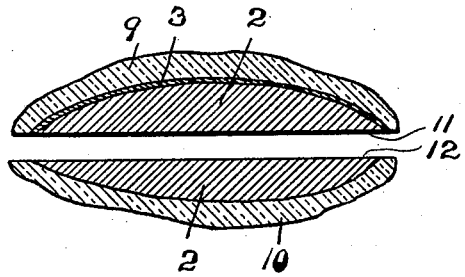

In the said drawings, Figure 1 is a face view of one of the smaller-sized cuttlefish-bones, provided on its "skin side" with a reinforcing layer or shell. Fig. 2 is an edge view of the same, and Fig. 3 is a vertical section of the same. Fig. 4 is a face view of the piece of cuttlefish-bone, with a portion of softer bone part cut away, on the dotted line indicated in said Fig. 3 of the drawings, to provide the said reinforced cuttlefish-bone with a flat and perfectly smooth surface. Fig. 5 is an edge view of the said parts represented in Fig. 4 of the drawings, and Fig. 6 is a vertical section of the same. Fig. 7 is a representation of a pair of reinforced cuttlefish-bones or dorsal plates, the flattened surfaces having received the impression of a ring-shaped matrix, and also illustrating an arrangement of grooves for the purposes of a pouring-duct and air or gas passages. Fig. 8 represents the two plates or bones illustrated in said Fig. 7 with their edge portions cut or sawed away to provide a pair of mold-sections, which can be placed upon each other and readily secured together for the purpose of producing the complete mold. Fig. 9 is a horizontal cross-section, and Fig. 10 a vertical section, of one of the mold-sections represented in said Fig. 8. Fig. 11 is a vertical section of the said two mold-sections represented in said Fig. 8 when the two sections are placed upon each other. Fig. 12 is an edge view of one of the larger-size cuttlefish-bones or dorsal plates of the cuttlefish, the same being provided upon all of its faces with a reinforcing layer of plaster-of-paris or other material, the said reinforcing layer being represented in vertical section; and Fig. 13 is a horizontal section of the parts illustrated in said Fig. 12, but representing the bone and its reinforcing layers or shells cut or sawed upon the dotted line in said Fig. 12, so as to provide two separate mold or flask sections, each of which is to be provided with an impression from a pattern or matrix of the article to be cast.

Similar characters of reference are employed in all of the said above-described views to indicate corresponding parts.

Referring to the said drawings, the reference character 1 indicates the usual form of cuttlebone or dorsal plate, comprising the soft bone part or body 2 and the hard skin 3, both of which are of a rough convex configuration when in their rough state.

Upon one of the outer surfaces of the cuttlebone 1, as the hard skin or portion 3, I have arranged and secured thereto a layer 4 of any suitable plastic material, preferably plaster-of-paris, which when it has set and has hardened provides a strong and durable backing or resistible shell which reinforces the whole bone 1 and prevents the breaking or cracking of the same when used under pressure in the manner and for the purposes to be presently described. In this condition these reinforced cuttlebones are supposed to be placed in the market to be purchased by the mold-maker for his use in the casting of jewelry or other ornaments. The mold-maker next takes the reinforced cuttlebones and with a suitable saw or other tool removes a sufficient portion of the soft bone part or body 2 (on the dotted line indicated in Fig. 3 of the drawings) to provide the flat and smooth surface 5. (Indicated in Figs. 4, 5, and 6.)

To produce the mold or flask, a matrix or pattern, in the present illustration in the form of an ordinary finger-ring, is then pressed under pressure into the soft bone portions 2 of two of the said reinforced cuttlebones to provide a pair of registering or correspondingly-arranged depressions 6 of the shape of the casting desired. After these depressions 6 have been made in the soft bone portions 2 a channel or groove 7 and other suitably-arranged channels or grooves 8 are scraped or otherwise formed in the flat and smooth surface 5 of the two reinforced bones, as clearly indicated in Fig. 7 of the drawings. The pair of reinforced bones are then properly trimmed to provide a pair of squared or other suitably-shaped mold-sections 18, as indicated in Fig. 8 of the drawings. After these mold-sections 8 have been produced they can be placed upon each other in the manner indicated in Fig. 11 of the drawings, and suitably secured together in any suitable manner to cause the depressions 6 to register with each other. At the same time the channels or grooves 7 will be located directly over each other to provide a funnel-shaped pouring-duct, into which the molten metal is run to fill the depressions 6 and solidify therein. The channels or grooves 8 will also register with one another, and thereby provide suitable exits for the escape of any air and gases from the mold or flask during the process of casting. After the form has been cast it can readily be removed from the two mold-sections by the separation of said sections, which can be employed in the next casting operation for producing another form, as will be clearly understood.

When the cuttlebones are extra large, as indicated in Figs. 12 and 13 of the drawings, the entire outer surface of the bone may be enveloped with layers 9 and 10 of a plastic or other suitable material, the layer 9 reinforcing the hard skin portions 3 of the bone and the layer 10 reinforcing the soft body or bone portion 2, as clearly indicated. The reinforced cuttlebone is then cut on the dotted line indicated in said Fig. 12, whereby the two bone sections 11 and 12 (represented in Fig. 13) are produced. These sections are then provided in the manner hereinabove described with suitable depressions by means of patterns of the articles or forms to be cast and then cut up into one or more pairs of mold-sections to provide one or more molds or flasks to be used in the process of casting.

Heretofore it has been the practice to use these cuttlebones or dorsal plates of the cuttlefish without any reinforcing-shell, and it has been found that in the small-sized bones or plates, after they have been cut down to provide the flat and smooth surfaces 5, in pressing the matrix or pattern into the soft bone portion 2 the pressure exerted in many instances was too great to enable the cuttlebone to withstand the strain. Many of the small bones would thereby become broken or cracked and rendered entirely useless to the manufacturer. This did not merely cause a loss of the bone, but also meant a great loss in time and expense in labor. To some extent this was overcome by the use of larger cuttlebones; but this entailed an additional cost of the bone, since the large bones are scarce and more costly, and then also the upper soft bone portion which was cut away had to be discarded, owing to the fact that it is without a hard skin, and therefore is incapable of withstanding the strain due to pressure in pressing the matrix or pattern into the soft bone body.

By the arrangement of the reinforcing layers or shells 9 and 10 in the manner set forth in connection with Figs. 12 and 13 this loss or waste of material is entirely overcome, and while by the present invention we are enabled to use all the small cuttlebones without the danger of breakage, as heretofore, both halves or sections of a large cuttlebone may be used without any undue loss or waste of the material, and, furthermore, where heretofore two of the larger cuttlebones were necessary to produce one mold or flask one bone can now be used to produce the same mold.

Having thus described our invention, what we claim is—

1. As a new article of manufacture in the art of producing molds from the cuttlebones or dorsal plates of the cuttlefish, the combination, with a dorsal plate or cuttlebone, of a reinforcing material arranged against the skin surface of said plate or bone, all arranged and constructed to produce a plate or bone which is resistible against breakage due to pressure, substantially as and for the purpose set forth.

2. As a new article of manufacture, a mold-section, consisting of a body portion of bone material adapted to receive an impression, and a layer or shell of reinforcing material arranged against the skin portion of said bone material to cause the same to be resistible against breakage due to pressure, substantially as and for the purpose set forth.

3. As a new article of manufacture, a mold-section, consisting of a body portion of a dorsal plate or cuttlebone of the cuttlefish, and a layer or shell of reinforcing material arranged against the skin portion of said plate or bone, to cause the same to be resistible against breakage due to pressure, substantially as and for the purpose set forth.

4. As a new article of manufacture, a mold-section, consisting of a body portion of a dorsal plate or cuttlebone of the cuttlefish, and a layer or shell of plaster-of-paris arranged against the skin portion of said plate or bone to cause the same to be resistible against breakage due to pressure, substantially as and for the purpose set forth.

5. As a new article of manufacture, a mold-section consisting of a body portion of a dorsal plate or cuttlebone of the cuttlefish, an impression made by means of a pattern in the soft bone portion of the said plate or bone, a groove or channel leading from said impression to the edge of the said plate or bone, and a layer or shell of a reinforcing material arranged against the skin portion of said plate or bone to cause the same to be resistible against breakage due to pressure, substantially as and for the purpose set forth.

6. As a new article of manufacture, a mold-section, consisting of a body portion of a dorsal plate or cuttlebone of the cuttlefish, an impression made by means of a pattern in the soft bone portion of said plate or bone, a groove or channel leading from said impression to the edge of the said plate or bone, and a layer or shell of plaster-of-paris arranged against the skin portion of said plate or bone to cause the same to be resistible against breakage due to pressure, substantially as and for the purpose set forth.

7. The combination, with a pair of mold-sections, each section comprising a dorsal plate or cuttlebone of the cuttlefish, and having a flat surface, provided with an impression made by means of a pattern, and a groove or channel leading from each impression to the edge of the plate or bone, of a layer or shell of reinforcing material arranged against the outer skin surface of one of the mold-sections, all substantially as and for the purpose set forth.

8. The combination, with a pair of mold-sections, each section comprising a dorsal plate or cuttlebone of the cuttlefish, and having a flat surface provided with an impression made by means of a pattern, and a groove or channel leading from each impression to the edge of the plate or bone, of a layer or shell of plaster-of-paris arranged against the outer skin surface of one of the mold-sections, all substantially as and for the purpose set forth.

In testimony that we claim the invention set forth above we have hereunto set our hands this 10th day of April, 1902.

ALBERT A. GEIGER.
DANIEL C. BAUER.
JOSEF PEJCHAR.

Witnesses:
FREDK. C. FRAENTZEL,
W. B. FRAENTZEL.